Aug. 29, 1967  A. D. GRONNER ETAL  3,338,098

MASS VOLUMETRIC GAGE

Filed Sept. 28, 1965

INVENTORS
ALFRED D. GRONNER
SHERWOOD THALER

BY *Edwin E. Greigg*
ATTORNEY

United States Patent Office 3,338,098
Patented Aug. 29, 1967

3,338,098
MASS VOLUMETRIC GAGE
Alfred D. Gronner, White Plains, and Sherwood Thaler, Spring Valley, N.Y., assignors to Simmonds Precision Products, Inc., Tarrytown, N.Y., a corporation of New York
Filed Sept. 28, 1965, Ser. No. 490,988
6 Claims. (Cl. 73—304)

ABSTRACT OF THE DISCLOSURE

A fuel gauging system which provides both volumetric and mass indications utilizing a single set of fuel tank capacitive sensing units, employing a first rebalancing bridge circuit having one arm connected to the fuel tank capacitive sensing unit for indicating a mass reading and a second rebalancing bridge circuit for indicating volumetric readings having one of its arms connected to the capacitive sensing unit arm of the first bridge circuit by a cyclic sharing switch.

---

Figure 2:
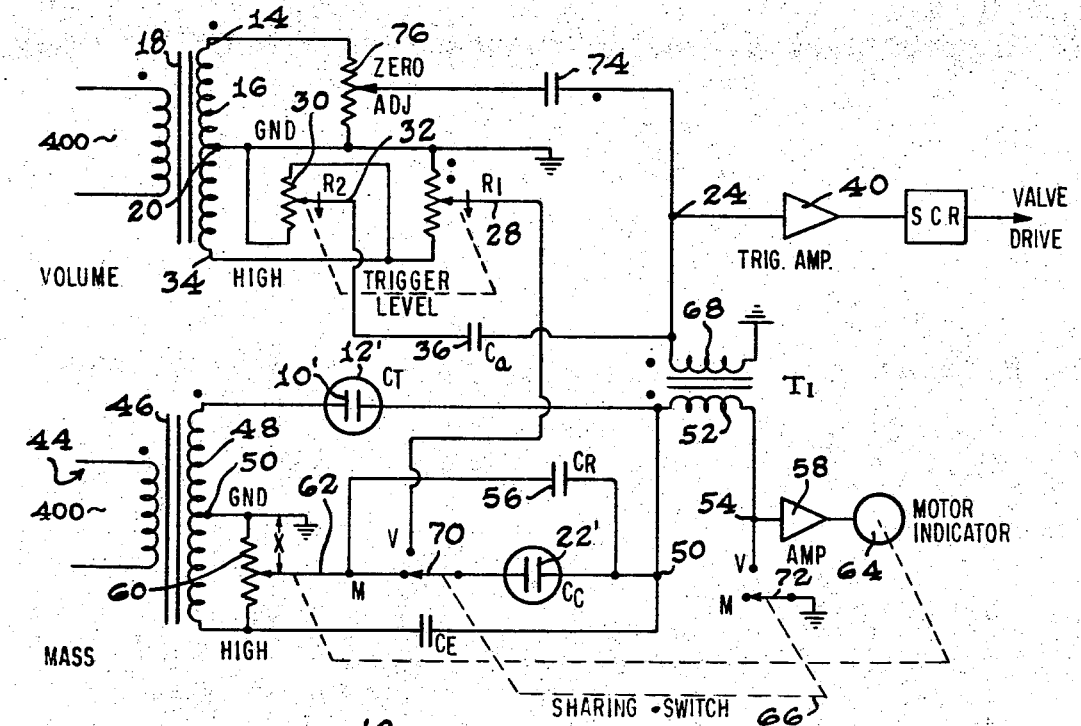

The present invention relates to fuel gauging systems and more particularly to a gauging system which will provide both mass and volumetric indication from a single gauging apparatus for a fluid tank.

As known in the art, the continuous rebalancing measuring bridge generally employs a capacitor measuring device arranged with its capacitor electrodes vertically in the fuel tank. The level of the fuel between the capacitor electrodes depends upon the fuel level in the fuel tank. The capacitor is designed so its capacitance is a function of the dielectric constant of the material between its space electrodes and also the height of the fuel level. Accordingly, its capacitance will change with a change in fuel level. The bridge is adapted to compare a reference signal with the measuring signal furnished by the measuring capacitor wherein a resultant signal proportional to the difference of the two is amplified and then caused to operate a motor which will restore the bridge to balance. The degree of correction required to restore the bridge to balance is an indication of the capacitance of the transducer and thus a reflection of the quantity of fuel in the fuel tank. In a compensated type of bridge measuring system, a second capacitor is mounted in the fuel tank so that it is at all times immersed in the fuel. The compensating capacitor is arranged in the bridge circuit to compensate with differences in bridge measurements that may otherwise arise by reason of the fact that the density and dielectric constant of fuels vary disproportionately.

When a gauge of the above type is employed to measure the quantity of fuel in an aircraft fuel tank, it is now conventional practice to calibrate the indicator in terms of mass or weight. If the measuring condenser is profiled and some means is provided to compensate for capacity index variation, an indication representing the mass of fluid in the container can be realized.

Oftentimes, and particularly in aircraft, volume indications, as well as mass indications, of fuel quantity are desirable. Heretofore this may have been achieved by providing separate and complete gauging systems with independent calibrated indicators at separate locations. Since each bridge network of each gauging system is complete per se, the bridge will have its individual capacitive-type measuring device or combination of such devices for the compensating bridge. This is not entirely satisfactory because of a multiplicity of such capacitors in each fuel tank and because of the relative expense of the capacitor-type device which must be designed and fabricated with great care.

Accordingly, it is the principal object of this invention to provide means for combining a mass and volumetric indication from a single set of fuel tank units.

It is a further object of this invention to provide a volume gauging system for triggering a trip valve at preselected heights of the fuel in the fuel tank.

It is yet another object of this invention to provide a mass volume gauging system operating from a single set of fuel tank units and employing a sharing switch means for registering mass or volume indications of the fuel in the fuel tank.

In accordance with one embodiment of a mass volume gauging system utilizing the principles of this invention, there is provided a volume gauging system utilizing a bridge network comprising a measuring condenser constructed and arranged with respect to the container in which it is to be employed, such that its capacity is proportional to $C_o + V(K-1)$ where $C_o$ represents the total dry capacitance of the condenser and $V$ represents the volume of fluid in the container; means connecting the measuring condenser in a first circuit for producing a current therein having a first component proportional to $C_o$ and a second component proportional to $V(K-1)$; a second circuit including means for producing a third and fourth component of current having a total magnitude equal to the first component and means for producing therein variable components of current; balancing means coupled to both the first and second circuits responsive to any inequality between the sum of the first and second components and the sum of the third and fourth variable components of current for adjusting the variable components in directions to reduce the inequality to zero. This adjustment determines the position of the balancing means which depend upon the bridge network unbalance due to changes in the air fuel level in the container. The balanced condition cancels density changes in the fuel so that the adjustments of the variable components represent the fuel air interface level. The container unit may be profiled to create a volumetric measurement.

Figure 1:
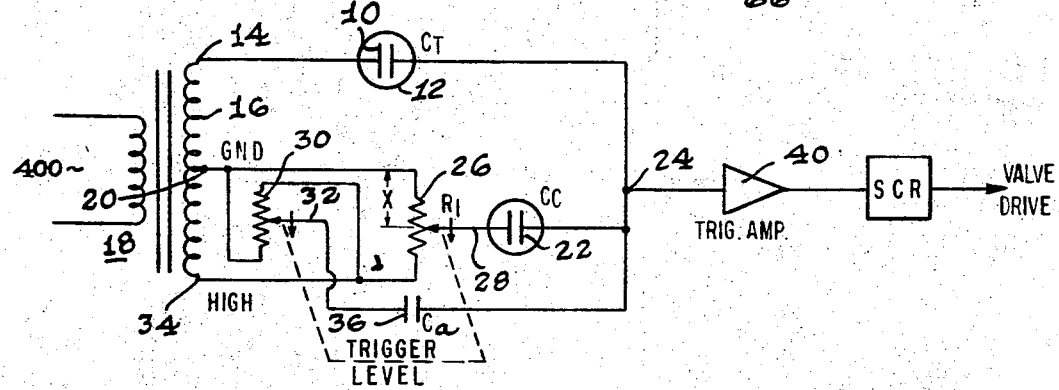

A better understanding of the invention will be had after reading the following detailed description with reference to the appended drawings in which:

FIG. 1 is a schematic circuit diagram of a mass volumetric gauging system utilizing the principles of this invention; and FIG. 2 is a schematic circuit diagram of a volumetric gauging system.

Referring now to FIG. 1, the essential requirements of a circuit for indicating volume of fuel in a container are shown. The measuring condenser 10 having a pair of electrodes is provided for immersion in a container 12. The condenser 10 is connected to the end terminal 14 of the secondary 16 of transformer 18. For convenience in explanation, the secondary winding 16 is provided with a center tap 20 which is shown connected to ground. A condenser 22 having a fixed capacity of the fluid in the container 12 $C_c$ is connected between junction 24 and a movable contact or tap 28 which contacts the rebalancing potentiometer 26 having a resistance $R_1$. The rebalancing potentiometer 26 is connected between the ground tap 20 and the other end 34 of the secondary 16 of the transformer 18. The bridge is therefore caused to balance between $C_t$ and $R_1C_c$. Also connected to the junction 24 is a capacitor 36 having a capacitance $C_a$ in air. Capacitor 36 is connected to a movable tap 32 contacting a rebalancing potentiometer 30 having a resistance $R_2$. The rebalancing potentiometer 30 is connected between ground and the secondary 34 in the manner shown. The bridge network then is caused to balance between $C_t$ and $R_2C_a$. As the fluid level rises in $C_t$, balance $R_1C_c$ rises. At the same time the air level decreases in $C_t$ and balance $R_2C_a$ decreases. A null servomotor (not shown) may be provided to determine the $R_1$, $R_2$ positions depending upon the bridge unbalance due to changes in the air fuel level in $C_t$. Balance cancels the density changes in the fuel so that potentiometer positions $R_1$ and $R_2$ represent fuel air interface level. The container unit may be profiled as described in the patent to Ryder, No. 2,981,105, issued Apr. 25, 1961, for volumetric measurement. As shown in FIG. 1, the junction 24 leads to a trigger amplifier 40 which triggers a silicone-controlled rectifier causing a valve drive associated with the fluid flow system to the container to be operated. A trigger level is set for establishing a predetermined voltage E at junction 24. Thus, when a value of $C_t$ becomes such that a predetermined voltage is developed at 24, the valve drive comes into operation. The voltage at 24 is established by moving $R_1$ and $R_2$ in desired directions, for example, if $R_1$ and $R_2$ are moved in the direction of the arrows as shown an increasing $C_t$ is required to create the proper signal at junction 24. This represents a new height of liquid level in the container. Moving the potentiometer taps $R_1$ and $R_2$ in the direction of ground requires decreasing $C_t$ to create a proper signal at E. This, again, represents another heigh of liquid level in the container.

In FIG. 2, the volume gauging circuitry as described above is integrated with a mass gauging system. An alternating voltage of suitable frequency, for example, 400 cycles, is supplied by a source 44 to a transformer 46. The secondary winding 48 of transformer 46 is grounded at its center tap at 50. One side of secondary winding 48 is connected to capacity measuring transducer 10′ in the fluid container 12′. The capacitor 10′ is conductively connected in series with a primary winding 52 of a pick-off transformer $T_1$. Winding 52 is connected by a shielded line to an input junction 54 of a current sensing amplifier 58. A potentiometer 60 is connected across the lower portion of the other side of the secondary winding 48. Potentiometer 60 has a movable tap 62 which is connected to one side of the compensating capacitor 22′, the other side of which is connected to the input junction 50. The bridge balances between the air fuel mass in $C_t$ against the capacitors and voltage $x$ on the opposite side of the bridge. As shown by the dashed line connection, the null servo motor 64 determines the position of movable tap 62 depending upon bridge unbalance due to changes in the value of $C_t$. It is understood that the value of $C_t$ is dependent on an air fuel mixture whose combined dielectric constant is set by the percentage of air and the fuel coverage. The voltage $x$ represents fluid mass at $C_t$ because the density quantities in the fluid ($C_t$ on one side, $C_c$ and $C_r$ on the other side) cancel in the bridge network $C_e$ balances $C_t$ when R is at ground and the tank is empty. $C_r$ provides the reference capacitance signal against which $C_t$ is compared. A solid state type sharing switch 66 with automatic drive for time duty cyclic operation is provided for transferring $C_t$ and $C_c$ through the pick-off transformer $T_1$ to the volume gauge similar to that shown in FIG. 1. As shown in FIG. 2, the secondary winding 68 of transformer $T_1$ couples the induced signal from the measuring capacitor 10′ for comparison with impedances $R_1C_c$ and $R_2C_a$ as explained. The two bridge circuits are coupled for these conditions when the switch 66 positions the taps 70, 72 on the contacts V (volume); tap 70, then, grounds the mass reading input to amplifier 58. As shown in FIG. 2, the taps 70, 72 are positioned on contacts M (mass) in which case the circuitry is set to provide a mass reading at the motor indicator 64. It is understood that a null servomotor indicator could be provided for the valve drive bridge circuit in order to provide volume indication rather than the valve drive operation as above explained. Turning again to FIG. 2, a capacitance 74 and adjustable resistance 76 is provided in the remaining arm of the volume bridge circuit for providing an adjustable reference impedance.

Although only one embodiment of the invention has been depicted and described, it will be apparent that this embodiment is illustrative in nature and that a number of modifications in the apparatus and variations in its end use may be effected without departing from the spirit or scope of the invention as defined in the appended claims.

That which is claimed is:

1. Apparatus for measuring the characteristic of a dielectric material comprising a first bridge circuit responding to a signal furnished by a transducer measuring means coupled in an arm thereof, said first bridge having a first impedance reference means for producing a reference signal for comparing with the signal furnished by said transducer means so that the resultant signal is used to restore the first bridge to balance and the degree of correction required for rebalancing the first bridge is an indication of the change of impedance of the measuring transducer, a second bridge circuit having a second impedance reference means in an arm thereof, switching means for connecting a portion of said second impedance reference means to the other arm of said first bridge circuit, means for supplying said first and second bridge circuits with an energizing alternating current voltage of like phase and transformer means having a primary winding connected in said arm of said first bridge circuit conductively in series with said transducer measuring means and having a secondary winding included in said arm of said second bridge circuit for coupling an induced signal to the output of said second bridge circuit.

2. An apparatus as defined in claim 1 wherein said switching means is of the cyclic operating type.

3. In an apparatus for measuring a characteristic of a dielectric material comprising, a first bridge circuit responding to a signal furnished by a transducer measuring means coupled in an arm thereof which means has an impedance which is at least a function of the dielectric constant of said material, a second bridge circuit including signal responsive means, means for supplying said first and second bridge circuits with energizing alternating current voltage of like phase, transformer means having a primary winding connected in said arm of said first bridge circuit conductively in series with said transducer measuring means and also having a secondary winding included in an arm of said second bridge circuit for coupling an induced signal to said signal responsive means, said second bridge circuit having rebalancing potentiometer means in one arm thereof and switching means connecting a portion of said rebalancing potentiometer means to the other arm of said first bridge circuit, said switching means being connected to the output of said first bridge for switching said output to ground simultaneously with closing the circuit defining said portion of said rebalancing potentiometer means and said other arm of said first bridge circuit.

4. An apparatus as defined in claim 3 wherein said switching means is of the cyclic operating type.

5. Apparatus for measuring a quantity of dielectric fuel in a fuel tank comprising a first bridge circuit responding to a signal furnished by a capacitor-type measuring means coupled in an arm thereof which means has spaced electrodes adapted to be immersed in said fuel, said means having a capacitance which is a function of both the level of dielectric fuel between its spaced electrodes and the fuel dielectric constant, a first impedance reference means in the other arm of said first bridge circuit for providing a signal to be compared with the signal furnished by said measuring means so that the resultant signal is used to restore the first bridge to balance and the degree of correction required for rebalancing the first bridge is an indication of the mass of fuel in said fuel tank, a second bridge circuit having a second and third impedance reference means in an arm thereof, means for supplying said first and second bridge circuits with energizing alternating current voltage of like phase, transformer means having a primary winding connected in said arm of said first bridge circuit conductively in series with said measuring means and also having a secondary winding included in said arm of said second bridge circuit, switching means coupling said third impedance reference means in said second bridge circuit to said other arm in said first bridge circuit, said switching means being operable to ground the output of said first bridge circuit, whereby said transformer secondary winding in said second bridge circuit couples an induced signal to the output of said second bridge circuit.

6. An apparatus as defined in claim 5 wherein said switching means is of the cyclic operating type.

References Cited

UNITED STATES PATENTS

| | | | |
|---|---|---|---|
| 2,940,116 | 6/1960 | Storm et al. | 73—304 |
| 3,025,704 | 3/1962 | Pearson | 73—304 |
| 3,224,275 | 12/1965 | Fahley | 73—304 |

LOUIS R. PRINCE, *Primary Examiner.*

S. C. SWISHER, *Assistant Examiner.*